US008565993B2

(12) United States Patent
Lu et al.

(10) Patent No.: US 8,565,993 B2
(45) Date of Patent: Oct. 22, 2013

(54) ENHANCED YAW STABILITY CONTROL TO MITIGATE A VEHICLE'S ABNORMAL YAW MOTION DUE TO A DISTURBANCE FORCE APPLIED TO VEHICLE BODY

(75) Inventors: Jianbo Lu, Livonia, MI (US); Joseph Carr Meyers, Farmington Hills, MI (US); Jeffrey Dan Rupp, Ann Arbor, MI (US); Bengt Johan Henrik Jacobson, Molnlycke (SE); Mathijs Willem Geurink, Olofstorp (SE); Doug Scott Rhode, Farmington Hills, MI (US); Olle Johansson, Ljungskile (SE)

(73) Assignee: Volvo Car Corporation (SE)

( * ) Notice: Subject to any disclaimer, the term of this patent is extended or adjusted under 35 U.S.C. 154(b) by 775 days.

(21) Appl. No.: 12/595,829

(22) PCT Filed: Oct. 11, 2006

(86) PCT No.: PCT/US2006/039605
§ 371 (c)(1),
(2), (4) Date: Feb. 15, 2011

(87) PCT Pub. No.: WO2007/044744
PCT Pub. Date: Apr. 19, 2007

(65) Prior Publication Data
US 2011/0166744 A1 Jul. 7, 2011

Related U.S. Application Data

(60) Provisional application No. 60/725,498, filed on Oct. 11, 2005.

(51) Int. Cl.
*G06F 7/70* (2006.01)
(52) U.S. Cl.
USPC ............................. 701/70; 701/29.2; 701/34
(58) Field of Classification Search
USPC ......... 701/34, 38, 82, 29.2, 70; 280/734–735; 303/140, 146
See application file for complete search history.

(56) References Cited

U.S. PATENT DOCUMENTS

| 4,828,061 A | 5/1989 | Kimbrough |
| 5,711,024 A * | 1/1998 | Wanke ............................ 701/82 |

(Continued)

FOREIGN PATENT DOCUMENTS

| DE | 19628486 A1 | 1/1997 |
| DE | 198 12 237 | * 3/1998 |

(Continued)

OTHER PUBLICATIONS

Steering Angle-Disturbance Observer (SA-DOB) based yaw stability control for electric vehicles with in-wheel motors; Kanghyun Nam et al., Control Automation and Systems (ICCAS), 2010 International Conference on; Publication Year: 2010 , pp. 1303-1307.*

(Continued)

*Primary Examiner* — Cuong H Nguyen
(74) *Attorney, Agent, or Firm* — Angela M. Brunetti

(57) ABSTRACT

An enhanced stability control system (200) for a vehicle includes a vehicle status sensor that generates a sensor signal. A driver input sensor that generates an input signal. A controller (214) may disable normal yaw stability control operation and enable body-force-disturbance (BFD) yaw stability control (YSC) operation, which includes at least partially reducing response functions of the normal yaw stability control associated with the input signal, in response to the sensor signal and performing BFD-YSC functions to achieve desired control performance upon the detection of BFD reception. The controller (214) may also or alternatively compare the sensor signal to a threshold and detect an improperly functioning/inoperative vehicle status sensor. The controller (214) disregards information associated with the improperly functioning/inoperative vehicle status sensor, and continues to perform enhanced yaw stability control operations.

16 Claims, 3 Drawing Sheets

(56) References Cited

U.S. PATENT DOCUMENTS

| | | | |
|---|---|---|---|
| 5,864,769 A | | 1/1999 | Inagaki |
| 6,223,114 B1 * | | 4/2001 | Boros et al. ............... 701/70 |
| 6,859,713 B2 * | | 2/2005 | Pallot ............... 701/72 |
| 7,359,787 B2 * | | 4/2008 | Ono et al. ............... 701/82 |
| 7,489,995 B2 * | | 2/2009 | Yasui et al. ............... 701/37 |
| 7,983,801 B2 * | | 7/2011 | Milot ............... 701/1 |
| 2003/0093206 A1 * | | 5/2003 | Pallot ............... 701/70 |
| 2003/0093207 A1 * | | 5/2003 | Pallot ............... 701/70 |
| 2006/0025896 A1 * | | 2/2006 | Traechtler et al. ............... 701/1 |
| 2006/0259225 A1 * | | 11/2006 | Ono et al. ............... 701/82 |
| 2008/0059034 A1 * | | 3/2008 | Lu ............... 701/71 |
| 2008/0183353 A1 * | | 7/2008 | Post et al. ............... 701/42 |
| 2011/0166744 A1 * | | 7/2011 | Lu et al. ............... 701/34 |
| 2012/0316731 A1 * | | 12/2012 | Harrison et al. ............... 701/41 |

FOREIGN PATENT DOCUMENTS

| | | | |
|---|---|---|---|
| DE | 10 2004 036 565.2 | * | 7/2004 |
| DE | 102004033900 A1 | | 7/2005 |
| EP | 0694464 A1 | | 1/1996 |
| FR | 01 13543 | * | 10/2001 |
| FR | 01/13544 | * | 10/2001 |
| JP | 2003-393306 | * | 11/2003 |

OTHER PUBLICATIONS

Robust yaw stability control for electric vehicles based on Steering Angle-Disturbance Observer (SA-DOB) and tracking control design; Kanghyun Nam; Sehoon Oh; Hori, Y.; IECON 2010—36th Annual Conference on IEEE Industrial Electronics Society Digital Object Identifier: 10.1109/IECON.2010.5675324; Publication Year: 2010 , pp. 1943-1948.*

Robust yaw stability control for electric vehicles based on active steering control; Kanghyun Nam et al.; Vehicle Power and Propulsion Conference (VPPC), 2010 IEEE; Digital Object Identifier: 10.1109/VPPC.2010.5729202; Publication Year: 2010 , pp. 1-5.*

Robust Yaw Stability Controller Design and Hardware-in-the-Loop Testing for a Road Vehicle; Guvenc, B.A.; Guvenc, L.; Karaman, S. ; Vehicular Technology, IEEE Transactions on; vol. 58 , Issue: 2; Digital Object Identifier: 10.1109/TVT.2008.925312 Publication Year: 2009 , pp. 555-571.*

A numerical algorithm for nonlinear L2-gain optimal control with application to vehicle yaw stability control Milic, Vladimir; Di Cairano, Stefano; Kasac, Josip; Bemporad, Alberto; Situm, Zeljko;Decision and Control (CDC), 2012 IEEE 51st Annual Conference on; Digital Object Identifier: 10.1109/CDC.2012.6426894;Publication Year: 2012 , p. 5.*

* cited by examiner

ENHANCED YAW STABILITY CONTROL TO MITIGATE A VEHICLE'S ABNORMAL YAW MOTION DUE TO A DISTURBANCE FORCE APPLIED TO VEHICLE BODY

RELATED APPLICATION

The present application is related to and claims the benefit of U.S. Provisional Application 60/725,498, entitled "A POST IMPACT ACTIVE SAFETY SYSTEM: POST SIDE-IMPACT YAW STABILITY MANAGEMENT", filed on Oct. 11, 2005, and is incorporated by reference herein.

TECHNICAL FIELD

The present invention relates generally to vehicle control systems, vehicle sensing systems, and stability control systems. More particularly, the present invention is related to techniques for enhancing current stability control systems to mitigate undesired vehicle yaw motion due to a disturbance force applied to a vehicle body prior to losing tire force control.

BACKGROUND

Several vehicle control systems, which are used to augment the driving capability of a vehicle operator, currently exist. Those control systems include anti-brake-lock system (ABS), traction control system (TCS), and stability controls. Example stability control systems are electronic stability control (ESC) systems or sometimes referred to as yaw stability control (YSC) systems, and roll stability control (RSC) systems. The stability control systems are utilized to maintain controlled and stable vehicle operations for improved vehicle and occupant safety. The stability control systems are often used to maintain control of a vehicle following a desired travel direction, to prevent the vehicle from spinning out, and/or to prevent or mitigate a roll over event.

More specifically, the above YSC systems typically compare the desired direction of a vehicle based upon the steering wheel angle and the path of travel, which is determined from motion sensors located on the vehicle. By regulating the amount of braking at each corner of the vehicle and the traction force of the vehicle, the desired path of travel may be maintained.

Existing stability control systems are designed to correct undesired vehicle motion caused by a tire force disturbance, such as a tire force differential due to a road surface disturbance or due to a mismatch between the driving intention of a driver and a road surface condition. This mismatch usually happens when there is a significant difference between the front and the rear tire lateral forces applied to the vehicle (referred to as the lateral tire force differential), or there is a significant difference between the right and the left tire longitudinal tire forces (referred to as the longitudinal tire force differential), or a combination thereof. Such a tire force differential is called a tire force disturbance (TFD).

The existing YSC systems are effective in controlling the undesired vehicle motions due to the afore-mentioned TFD. The YSC systems activate brakes, which reduces engine torque, or vary the driving torque at individual wheels or axles so as to generate an active tire force differential to counteract the effect of the TFD. That is, the control mechanism and the vehicle disturbance are from the same source: the tire force variations or the tire force differentials.

For example, during a split mu braking event, the tires on the low mu side can be easily locked. Therefore, the tire longitudinal force differential between low mu side and the high mu side is generated. Such a TFD generates a yawing moment disturbance, which causes the vehicle to yaw abnormally towards the high mu side. When the vehicle is equipped with an ABS system, the wheels on the low mu side will be prevented from being locked to maintain a certain level of tire longitudinal forces. In this way, the TFD due to the side-to-side tire longitudinal force differential is reduced and the undesired vehicle yaw motion is reduced.

For another example, when a vehicle is driven at a high speed to negotiate a turn, the vehicle could saturate its front tire cornering forces such that there is a rear-to-front tire lateral force differential. Such a TFD will generate a yaw moment disturbance, which causes the vehicle to steer less than that requested by the driver. This is referred to as an understeer situation. When the existing YSC systems are used, the rear inside wheel is braked briefly to add a longitudinal force to generate a yaw moment to counteract the yaw moment disturbance generated by the TFD due to the rear-to-front tire lateral force differential. Hence the existing YSC systems can help correct an understeer situation due to a TFD.

For a further example, the braking of a vehicle at a turn can cause a large load transfer to the front such that the front tire cornering forces are increased, when the front tire forces before braking are below their saturation levels. Hence a TFD due to the front-to-rear tire cornering force differential is generated, which adds a yaw moment disturbance that causes the vehicle to steer more than that requested by the driver. This is referred to as an oversteer situation. By using the existing YSC systems, the front outside wheel is braked briefly to add a longitudinal force to generate a yaw moment to correct the oversteer. Note that braking in a turn can also cause a vehicle to under-steer when the vehicle forces are close to their saturation levels prior to the braking.

An undesired yaw motion may also be generated by a yaw moment disturbance caused when a vehicle receives a force disturbance other than a tire force disturbance. An example of which is an external force disturbance that is applied to the vehicle body, which is called a body force disturbance (BFD). A BFD may occur when a vehicle hits a fixed object, such as a tree, or when the vehicle is hit by another moving object, such as a moving vehicle or a missile. A BFD may also occur when the vehicle experiences a sudden strong wind gust applied to the vehicle body.

While the magnitude of the tire force disturbance is limited by the driving condition of the road surface, the magnitude of a BFD can be unlimited. For example, the collision of two moving vehicles may generate a body force disturbance with a magnitude that is several factors larger than the total tire forces. In a light collision, the magnitude of the BFD might be very close to the total tire force. The BFD is different from the TFD generated from the tire force differentials. A vehicle experiencing a BFD may have balanced tire forces (i.e., there are no significant tire force differentials among the 4 tires) and may have larger-than-normal vehicle motion such as yaw motion.

A yaw motion may be generated when a vehicle receives a BFD from an external source. Since the tire forces may be well balanced before and after receiving the BFD (i.e., there are no significant tire force differentials among the 4 tires), the existing stability control is ineffective, since it is designed to handle vehicle yaw motion due to a TFD generated from tire differentials. However it is natural to study when the existing stability control actuators can generate a tire force differential to counteract undesired motions due to some class of BFDs.

A BFD is said to be uncontrollable from the tire forces, when both the driving input and the stability control actuation can not generate enough active tire force differentials to counteract the motion of the vehicle caused by the BFD application. This is the case when the BFD is large and it overcomes the tire resistance such that all the tires are well saturated. Due to the saturated tire forces, any manipulation of the tire forces through braking, steering, or changing driving torque cannot generate enough active tire force differentials. Hence the vehicle loses its controllability through both driver steering and the stability control system. This is referred to as a loss-of-control event. One or more embodiments of the present invention control the motion of the vehicle before such a loss-of-control is reached.

Also, current stability control systems are designed to aid a vehicle driver in pursuing a driver intended action or course. This can result in increased destabilization and/or a collision when a vehicle driver panics, as a result of the impending or actual application of a BFD. During a BFD event, a driver may panic and perform driving tasks that are inappropriate or drastic in an attempt to avoid receiving the external body force disturbance (such as a vehicle-to-vehicle collision or a vehicle-to-missile collision, etc.), which can lead to further undesirable events.

In addition, during a BFD event where a vehicle may be hit from the side, the lateral excursion of the vehicle can result in the vehicle being tripped by a curb or the like or simply by road friction and the large experienced tire forces, due to the large vehicular yaw motion. Additional events can occur due to the abnormal path of the vehicle and the large path deviation.

Thus, there exists a need for an enhanced stability control system that provides improved control action to vehicle yaw motion generated from a controllable body-force disturbance (BFD).

SUMMARY OF THE INVENTION

One embodiment of the present invention provides an enhanced stability control system for a vehicle that includes a set of vehicle dynamics sensors that generate vehicle dynamics signals. A set of the driving input sensors generates driver input signals. The stability control system activates available actuators to generate active tire force differentials to control an undesired vehicle motion, which is caused by a tire force disturbance (TFD). A controller disables normal stability control operation (TFD stability control mode) and enables a BFD-stability control operation. In the BFD-stability control mode, the control system activates the available actuators to generate active tire force differentials to control the vehicle motion due to the vehicle receiving an external force disturbance applied to the vehicle body. This action includes at least partially reducing response functions associated with the input signal, in response to the sensor signal.

Another embodiment of the present invention, provides an enhanced stability control system for a vehicle that includes a vehicle status sensor that generates a sensor signal. A driver input sensor generates an input signal. The controller compares the sensor signal to a threshold and detects an improperly functioning/inoperative vehicle status sensor. The controller disregards information associated with the improperly functioning/inoperative vehicle status sensor, and continues to perform stability control operations.

The embodiments of the present invention provide several advantages. One advantage provided by an embodiment of the present invention is the ability to reduce the abnormal yaw motion of a vehicle after receiving a BFD.

Another advantage provided by an embodiment of the present invention is to enhance the operation of the traditional stability control tasks subsequent to improper operation or inoperative status of vehicle status sensor. This allows for reduction in yaw motion when one or more sensors are saturated, damaged, or providing unreliable information.

Yet another advantage provided by an embodiment of the present invention, is the ability to reduce the effectiveness of the driver inputs after the vehicle receives a controllable BFD. This allows for improved stability control without pursuing improper vehicle behavior due to driver panic actions.

Still another advantage provided by an embodiment of the present invention, is the disablement of normal stability control tasks and/or the adjustment of stability control parameters to further brake or stabilize a vehicle after the vehicle receives a controllable BFD.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION

Figure 1:
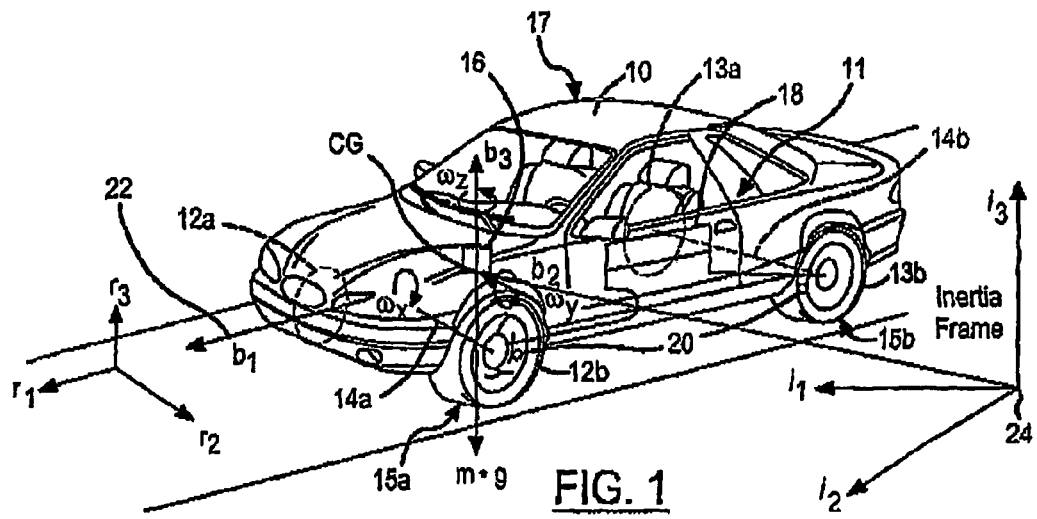
FIG. 1 is a perspective view of a vehicle with variable vectors and coordinate frames in accordance with an embodiment of the present invention.

In this invention, we consider the aforementioned BFD, which leads a vehicle to a larger-than normal yaw motion (e.g., with yaw rate magnitude larger than 100 degrees per second) that is well beyond the dynamic range of yaw controlled by prior yaw stability control systems (e.g., with yaw rate magnitude below 75 degrees per second). Abnormal yaw motion due to a BFD is usually larger than the yaw motion generated by the tire force disturbance of tire force differentials due to road surface condition variations that can be effectively controlled by the traditional stability controls. Although prior yaw stability control systems provide stabilization during normal operating conditions, it can be performance limited, ineffective, and/or can become inactive during an event when the vehicle receives a controllable BFD. For example, during a controllable BFD application, some sensors of current stability control systems can become saturated or damaged or inaccurate, which can cause current stability control systems to be ineffective.

A BFD may be an external force applied to a vehicle body with short duration and having a magnitude that is below a threshold, which could trigger the activation of passive safety devices, such as airbags. A BFD may be the forces generated when a vehicle is hit by a moving object, such as another moving vehicle or a projectile, or when the vehicle experiences a strong wind gust. A BFD may be the forces generated when a vehicle hits a fixed object, such as a tree or a pole, which causes a yaw motion of the vehicle that is larger than the normal yaw motion controlled by normal stability control.

A BFD is said to be controllable from the tire forces if it is not uncontrollable. This is the case when the magnitude of the BFD is not large enough to saturate tire forces of pertinent vehicle tires, such as the tire forces on a standard vehicle having four tires. Hence active tire force differentials may be generated to counteract the undesired motion due to the BFD through braking, steering, or changing driving torque. Using the above definition it is not hard to find that TFDs are controllable. Although the same actuators in the existing stability control can be used to generate active tire force differentials, the control law is different from existing stability controls. One reason for the difference is that the vehicle motion due to a controllable BFD can be beyond the motion range due to a TFD.

One particular controllable BFD is a BFD with a medium size magnitude, but is impulsive in nature. That is, the duration of the body force application is very short, for example, less than 0.1 seconds and the magnitude of the BFD is below the thresholds to activate passive safety devices. In this case, either not all the tires are saturated or the tire forces are saturated, but can be quickly reduced to below the saturation levels within a short period of time after the vehicle receives the BFD. Hence the tire force differentials to counteract the undesired motion due to the external force can be quickly established through braking, steering, or changing driving torques to counteract the undesired vehicle motion due to the BFD. Such a controllable BFD can happen, for example, when a moving vehicle is hit by another moving vehicle with small delta velocity along the direction of the BFD application, when a vehicle is hit by a projectile with dimensions much less than the dimensions of the vehicle, or when a moving vehicle hits a thin, tall, but fixed object such as a three or a pole.

The present invention enhances existing stability control to account for both TFDs and BFDs. Controllable BFDs may include a host vehicle being hit by a moving object, such as a moving vehicle, or include a host vehicle colliding into a fixed object, such as a pole or a tree. Such a stability control operation is called a BFD-stability control mode, while the normal stability control operation could be called a TFD-stability control mode.

In the following figures, the same reference numerals will be used to identify the same components. The present invention may be used in conjunction with vehicle control systems including a yaw stability control (YSC) systems, roll stability control (RSC) systems, lateral stability control (LSC) systems, integrated stability control (ISC) systems, or a total vehicle control system for achieving fuel economy and safety and the other vehicle level performances. The present invention is also described with respect to an integrated sensing system (ISS), which uses a centralized motion sensor cluster together with other decentralized sensors to determine the vehicle's motion states.

The centralized sensor cluster packs have several motion sensors in a compact unit and are mounted at a convenient place such that the signals therefrom can be used by the related ECUs. The centralized sensor cluster may measure six degree-of-freedom (DOF) signals, such as in an inertial measurement unit (IMU), which includes longitudinal, lateral, and vertical acceleration sensors that measure those accelerations at the cluster mounting location of the vehicle body; the roll, pitch, and yaw angular rate sensors that measure those angular rates of the rigid body on which the cluster is mounted.

The centralized sensor cluster may measure five DOF signals, which include longitudinal and lateral acceleration sensors that measure those accelerations at the cluster mounting location of the vehicle body; and the roll, pitch, and yaw angular rate sensors that measure those angular rates of the rigid body on which the cluster is mounted.

The centralized sensor cluster might measure four DOF signals, such as the one used in a RSC system (called a RSC sensor cluster), which includes a longitudinal acceleration and a lateral acceleration sensor, that measure those accelerations at the cluster mounting location of the vehicle body; and a roll rate sensor and a yaw rate sensor, that measure those angular rates of the rigid body on which the cluster is mounted.

The centralized sensor cluster might measure three DOF signals, such as the one used in an ESC system, which includes a lateral acceleration sensor, a longitudinal acceleration sensor and a yaw rate sensor.

The centralized sensor cluster might measure two DOF signals, such as the one used in some other ESC systems, which includes a lateral acceleration sensor and a yaw rate sensor.

Although a centralized motion sensor, such as an RSC sensor cluster is primarily described in this invention disclosure, the techniques described herein are easily transferable to using the other configuration of the centralized sensors.

Beside the aforementioned centralized sensor cluster, other decentralized sensors are used, including wheel speed sensors, steering wheel angle sensor and master cylinder pressure sensor, etc.

Also, a variety of other embodiments are contemplated having different combinations of the below described features of the present invention, having features other than those described herein, or even lacking one or more of those features. As such, it is understood that the invention can be carried out in various other suitable modes.

In the following description, various operating parameters and components are described for one constructed embodiment. These specific parameters and components are included as examples and are not meant to be limiting.

Referring to FIG. 1, an automotive vehicle 10 with a safety system 11 of the present invention is illustrated with the various forces and moments thereon during a rollover condition or a post collision event. Vehicle 10 has front right ($FR_W$) and front left ($FL_W$) wheel/tires 12a and 12b and rear right ($RR_W$) wheel/tires 13a and rear left ($RL_W$) wheel/tires 13b, respectively. The vehicle 10 may also have a number of different types of front steering systems 14a and rear steering systems 14b, including having each of the front and rear wheels 12a and 12b configured with a respective controllable actuator, the front and rear wheels 12a and 12b having a conventional type system in which both of the front wheels 12a are controlled together and both of the rear wheels 12b are controlled together, a system having conventional front steering and independently controllable rear steering for each of the wheels 12a and 12b, or vice versa. Generally, the vehicle 10 has a weight represented as Mg at the center of gravity of the vehicle 10, where g=9.8 m/s$^2$ and M is the total mass of the vehicle 10.

Besides the weight, there are longitudinal, lateral and vertical tire forces, and alignment moment, applied to the vehicle through the tire/road contact patches. In FIGS. 1, 15a and 15b show the resultant tire forces applied through the left-front and left rear tires. Such tire forces can generate tire force disturbance (TFD) due to the tire force differentials between front and rear wheels or between the right and left wheels. The stability controls utilize the available actuators to generate active tire force differentials to counteract the vehicle motions due to the TFD.

Besides the aforementioned TFD-induced undesired motion of a vehicle, the vehicle may experience undesired motion due to the reception of an external force that is not necessarily applied to the tire/road contact patch but is rather directly applied to the vehicle body. Such an external force applied to the vehicle is referred to as a body force disturbance (BFD). In FIG. 1, 17 shows a BFD, which is a resultant external force directly applied to the vehicle body. A BFD could be the received force by the vehicle body when it is hit by a moving object, such as a moving vehicle or a projectile. A BFD could also be the received force by the vehicle body when it hits a fixed object such as a tree or a pole.

The safety system 11 may also be used with or include active/semi-active suspension systems, an anti-roll bar, or airbags or other safety devices deployed or activated upon sensing predetermined dynamic conditions of the vehicle 10.

The control system includes a sensing system 16 that is coupled to a control system 18. The sensing system 16 includes the aforementioned integrated sensing system, which uses a centralized sensor cluster together with other decentralized sensors. The various sensors will be further described below and are shown with respect to FIG. 2. The sensors may also be used by the control system 11 in various determinations such as to determine a wheel lifting event, determine a height and position of loading, etc. The wheel speed sensors 20 are mounted at each corner of the vehicle and generate signals corresponding to the rotational speed of each wheel. The rest of the sensors of the sensing system 16 may be mounted directly on the center of gravity of the vehicle body, along the directions x, y, and z shown in FIG. 1. As those skilled in the art will recognize, the frame from $b_1$, $b_2$, and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. Calculations may take place in an inertial frame 24 that may be derived from the body frame 22 as described below.

FIG. 1 depicts a road frame system $r_1 r_2 r_3$ that is fixed on the driven road surface, where the $r_3$ axis is along the average road normal direction computed from the normal directions of the four-tire/road contact patches.

Figure 2:
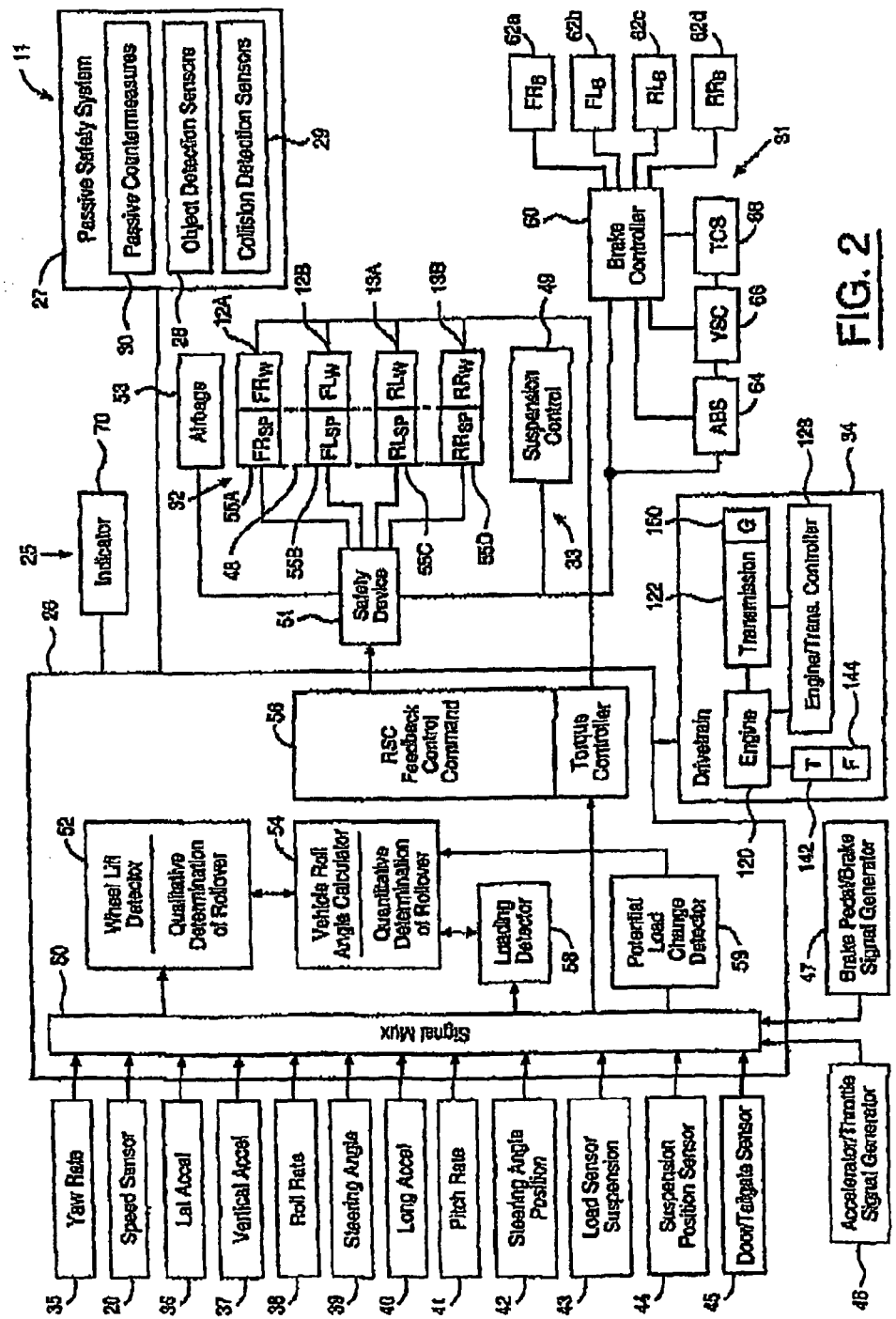
FIG. 2 is a block diagrammatic view of a control system incorporating a stability control system in accordance with an embodiment of the present invention.

Referring now also to FIG. 2, a block diagrammatic view of the control system 11 incorporating a stability control system 25 in accordance with an embodiment of the present invention is shown. The control system 11 has multiple modes of operation including a normal stability control system operating mode and a BFD stability control operating mode. While in the normal operating mode, the control system 11 performs and utilizes set parameters that are similar to that of traditional stability control systems such as ESC or YSC, and to activate the available actuators to generate active tire force differentials to correct the undesired vehicle motion due to a tire force disturbance (TFD) caused by tire force differentials due to the road surface disturbance or the mismatch between driver input and the road surface. When the vehicle receives an external force such as a BFD, the normal stability control may be ineffective or even improper to generate the necessary active tire force differential to counteract the undesired vehicle motion. However, upon detection of a BFD the control system 11 operates in an enhanced or modified operating mode. In the enhanced/modified operating mode vehicle control by a driver is reduced and the control system 11 generate control command based on the measured motion information to mitigate the undesired yaw motion. This is described in greater detail below.

The stability control system 25 may be or include a RSC system, an ESC system or YSC system, an ISC system, a LSC system, or some other stability control systems known in the art. Several of the stated control systems are shown and described with respect to FIGS. 2 and 3. The control system 11 is illustrated in further detail having a controller 26, a passive safety system 27-30, multiple active systems 31-34, various vehicle status sensors 20 and 35-47, and driver or vehicle operator input sensors 38, 43A, and 43B. The passive system 27 includes object detection sensors 28, collision detection sensors 29, and various passive countermeasures 30. The active systems may include a brake control system 31, a steering control system 32, a suspension control system 33, and a drivetrain control system 34. Based upon inputs from the sensors, controller 26 controls operation of the safety device 51.

The controller 26, as well as, the suspension control 49, the brake controller 60, and the engine/transmission controller 123 may be microprocessor based such as a computer having a central processing unit, memory (RAM and/or ROM), and associated input and output buses. The controllers may be application-specific integrated circuits or may be formed of other logic devices known in the art. The controller 26, the suspension control 49, the brake controller 60, and the engine/transmission controller 123 may each be a portion of a central vehicle main control unit, an integrated vehicle dynamics control module, a restraints control module, an integrated safety controller, a control circuit having a power supply, combined into a single integrated controller, or may be a stand-alone controller as shown. The controller 26, as well as, the suspension control 49, the brake controller 60, and the engine/transmission controller 123 may be configured to be mounted and located within a vehicle dashboard or vehicle panel or in some other location on the vehicle 10.

The object detection sensors 28 monitor an environment exterior to the vehicle 10 and generate object detection signals upon detection of an object. The object detection sensors 28 may be infrared, visible, ultrasonic, radar, active electromagnetic wave-ranging, or lidar based, a charged-coupled device, a series of photodiodes, or in some other form known in the art. Wave-ranging devices may include radar, lidar, stereo camera pairs, 3-D imagers, with active infrared illumination, or other wave-ranging devices known in the art. Vision sensors may refer to robotic cameras or other visual imaging cameras. The wave-ranging sensors and the vision sensors may be monocular or binocular and may be used to obtain height, width, depth, range, range rate, angle, and any other visual aspect information. Monocular cameras may be used to obtain less accurate and less reliable range and range rate data as compared to binocular cameras. The object detection sensors 28 may be in various locations on the vehicle and any number of each may be utilized. The object detection sensors may also include occupant classification sensors (not shown). The object detection sensor together with the motion sensor of the vehicle, such as acceleration sensors, may be used to detect the occurrence of a BFD. For example, upon the detection of an object approaching the vehicle, a large acceleration read would confirm that the vehicle is receiving a BFD due to the vehicle being hit by a moving object.

The collision detection sensors 29 are used to detect a collision when the vehicle is hit by a moving object or hits a stationary or fixed object. More specifically, the collision detection here needs to have the resolution to detect a controllable BFD. Notice that the resolution of the traditional acceleration crash sensors used in prior passive safety systems may not meet the need of detecting such a controllable BFD, certain modification may be needed. The collision detection sensors 29 may also be located anywhere on the vehicle 10 and generate collision detection signals in response to a collision. The collision detection sensors 29 may include sensors that are used as vehicle status sensors, such as the yaw rate sensor 35, the lateral acceleration sensor 36, and the longitudinal acceleration sensor 40. The collision detection sensors 29 may also be in the form of an accelerometer, a piezo electric sensor, a piezo resistive sensor, a pressure sensor, a contact sensor, a strain gage, or may be in some other form known in the art.

The passive countermeasures 30 may include internal air bag control, seatbelt control, knee bolster control, head restraint control, load limiting pedal control, load limiting steering control, pretensioner control, external air bag control, pedestrian protection control, and other passive countermeasures known in the art. Air bag control may include control over front, side, curtain, hood, dash, or other type of airbags known in the art. Pedestrian protection may include a deployable vehicle hood, a bumper system, or other pedestrian protective devices.

The brake control system 31 includes the brake controller 60 that is used to actuate front vehicle brakes 62a and 62b and rear vehicle brakes 62c and 62d. The vehicle brakes 62 are associated with the wheels 12 and 13. The brakes 62 may be independently actuatable through the brake controller 60. The brake controller 60 may control the hydraulic system of the vehicle 10. Of course, electrically actuatable brakes may be used in the present invention.

The steering control system 32 may include a number of different types of front and rear steering systems including having each of the front and rear wheels 12 and 13 configured with respective controllable actuators 55A-D. The wheels 12 and 13 may be controlled together or individually. The steering control system 32 may be electric in form, similar to an electric power assisted steering (EPAS) system.

The suspension control system 33 includes the suspension control 49, the suspension 48, and the suspension adjusting elements 55A-55D ($FR_{SP}$, $FL_{SP}$, $RR_{SP}$, $RL_{SP}$) that are associated with each wheel 12, 13. The suspension control 49 and adjusting elements 55A-55D may be used to adjust the suspension 48 to prevent rollover. The adjusting elements 55A-55D may include electrically, mechanically, pneumatically, and/or hydraulically operated actuators, adjustable dampers, or other known adjustment devices, and are described below in the form of actuators.

The drivetrain control system 34 includes an internal combustion engine 120 or other engine known in the art. The engine 120 may have a throttle device 142 coupled thereto, which is actuated by a foot pedal 144. The throttle device 142 may be part of a drive-by-wire system or by a direct mechanical linkage between the pedal 144 and the throttle device 142. The engine controller 123 may be an independent controller or part of the controller 26. The engine controller 123 may be used to reduce or increase the engine power. While a conventional internal combustion engine is calculated, the vehicle 10 could also be powered by a diesel engine or an electric engine or the vehicle could be a hybrid vehicle utilizing two or more types of power systems.

The drivetrain system 34 also includes a transmission 122, which is coupled to the engine 120. The transmission 122 may be an automatic transmission or a manual transmission.

A gear selector 150 is used to select the various gears of the transmission 122. The gear selector 150 may be a shift lever used to select park, reverse, neutral, and drive positions of an automatic transmission.

The vehicle status sensors 20 and 35-47 may include the yaw rate sensor 35, the speed sensor 20, the lateral acceleration sensor 36, the vertical accelerometer sensor 37, the roll angular rate sensor 38, the steering wheel (hand wheel) angle sensor 39, the longitudinal acceleration sensor 40, the pitch rate sensor 41, the steering angle (of the wheels or actuator) position sensor 42, the suspension load sensor 43, the suspension position sensor 44, the door/tailgate sensor 45, the accelerator/throttle signal generator 46, and the brake pedal/brake signal generator 47. It should be noted that various combinations and sub-combinations of the sensors may be used. The steering wheel angle sensor 39, the accelerator/throttle signal generator 46, and the brake pedal/brake signal generator 47 are considered driver input sensors, since they are associated with a pedal, a wheel, or some other driver input device.

Lateral acceleration, roll orientation and speed may be obtained using a global positioning system (GPS). Depending on the desired sensitivity of the system and various other factors, not all the sensors 20 and 35-47 may be used in a commercial embodiment. Safety device 51 may control one or more airbags 53 or a steering actuator 55A-D at one or more of the wheels 12A, 12B, 13A, 13B of the vehicle.

Roll angular rate sensor 38 and pitch rate sensor 41 may sense the roll condition or the wheel lifting condition of the vehicle based on sensing the height of one or more points on the vehicle relative to the road surface. Sensors that may be used to achieve this include but are not limited to a radar-based proximity sensor, a laser-based proximity sensor and a sonar-based proximity sensor. The roll rate sensor 38 may also use a combination of sensors such as proximity sensors to make a roll rate determination.

Roll rate sensor 38 and pitch rate sensor 41 may also sense the roll condition or the wheel lifting condition based on sensing the linear or rotational relative displacement or displacement velocity of one or more of the suspension chassis components. This may be in addition to or in combination with suspension position sensor 44. The suspension position sensor 44, roll rate sensor 38 and/or the pitch rate sensor 41 may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition or the wheel lifting condition may also be sensed by sensing directly or estimating the force or torque associated with the loading condition of one or more suspension or chassis components including a pressure transducer in an active air suspension, a shock absorber sensor such as the load sensor 43, a strain gauge, the steering system absolute or relative motor load, the steering system pressure of the hydraulic lines, a tire lateral force sensor or sensors, a longitudinal tire force sensor, a vertical tire force sensor, or a tire sidewall torsion sensor (although all of which are not shown, one skilled in the art would recognize and readily understand the incorporated use thereof). The yaw rate sensor 35, the roll rate sensor 38, the lateral acceleration sensor 36, and the longitudinal acceleration sensor 40 may be used together to determine that the wheel has lifted. Such sensors may be used to determine wheel lift or estimate normal loading associated with wheel lift.

The roll condition of the vehicle may also be established by one or more of the following translational or rotational positions, velocities or accelerations of the vehicle including a roll gyro, the roll rate sensor 38, the yaw rate sensor 35, the lateral acceleration sensor 36, the vertical acceleration sensor 37, a vehicle longitudinal acceleration sensor 40, lateral or vertical speed sensor including the wheel-based speed sensor 20, or other speed sensors, such as a radar-based speed sensor, a sonar-based speed sensor, a laser-based speed sensor, and an optical-based speed sensor.

Controller 26 may include a signal multiplexer 50 that is used to receive the signals from the sensors 20 and 35-47. The signal multiplexer 50 provides the signals to a wheel lift detector 52, a vehicle roll angle calculator 54, and to a roll stability control (RSC) feedback control command 56. Also, wheel lift detector 52 may be coupled to the vehicle roll angle calculator 54. The vehicle roll angle calculator 54 may also be coupled to the RSC feedback command 56. The RSC feedback command 56 may include a torque controller 57.

A loading detector 58 may also be included in controller 26. The loading detector 58 may be used to determine an additional mass of the vehicle and a distance of the mass as will be described below.

A potential load change detector 59 may also be included in controller 26. The potential load change detector 59 may qualitatively determine if there was a potential change in load for the vehicle. If the vehicle has stopped (from speed sensor 20) and a door/tailgate sensor indicates the door was opened, the load may have changed. Further the longitudinal acceleration may be compared to the estimated driveshaft torque. The driveshaft torque may be estimated by the engine or transmission controller 123. Suspension height changes may also indicate the load has changed. This may be obtained using the suspension position sensor 44. The load change may be directly observed at the load sensor 43, if the vehicle is so equipped. Transmission shifting changes depending on the load. Therefore, the transmission controller may output a signal indicating a changed load. The throttle movement from the accelerator pedal or actual throttle itself may be determined at the throttle signal generator 46. The brake signal generator 47 may generate a braking signal. By looking at the trend (more or less force or shorter or longer duration) a load may be determined.

The vehicle dynamic sensors 36-38 and 40-41 may be located at the center of gravity of the vehicle 10. Those skilled in the art will recognize that the sensors may also be located off the center of gravity and translated equivalently thereto.

The speed sensor 20 may be one of a variety of speed sensors known to those skilled in the art. For example, a suitable speed sensor may include a sensor at every wheel that is averaged by controller 26. The controller 26 may translate the wheel speeds into the speed of the vehicle 10. Yaw rate, steering angle, wheel speed and possibly a slip angle estimate at each wheel may be translated back to the speed of the vehicle 10 at the center of gravity. Various other algorithms are known to those skilled in the art. Speed may also be obtained from a transmission sensor (not shown). For example, if speed is determined while speeding up or braking around a corner, the lowest or highest wheel speed may not be used because of its error.

Load sensor 43 may be a load cell coupled to one or more suspension components. By measuring the stress, strain or weight on the load sensor 43 a shifting of the load can be determined.

Safety device 51 may control the position of the front right wheel actuator 55A, the front left wheel actuator 55B, the rear left wheel actuator 55C, and the right rear wheel actuator 55D. Although as described above, two or more of the actuators may be simultaneously controlled. For example, in a rack-and-pinion system, the two wheels coupled thereto are simultaneously controlled. Based on the inputs from sensors 20 and 35-47, controller 26 determines a roll condition and/or wheel lift and controls the steering position, braking of the wheels, and /or suspension characteristics, such as wheel lift and dampening.

Safety device 51 may be coupled to a brake controller 60. Brake controller 60 controls the amount of brake torque at a front right brake 62a, front left brake 62b, rear left brake 62c and a rear right brake 62d ($FR_B$, $FL_B$, $RR_B$, $RL_B$). Other safety systems such as an antilock brake system 64, a yaw stability control system 66 and a traction control system 68 may also benefit from the knowledge of the roll gradient, roll rate parameter, roll acceleration coefficient, additional mass and position of the mass. This information may impact the control strategy such as modifying the brake force.

The control system 11 also includes an indicator 70, which may be used to indicate to a vehicle operator various vehicle. The indicator 70 may include a video system, an audio system, a heads-up display, a flat-panel display, a telematic system, a dashboard indicator, a panel indicator, or other indicator known in the art. In one embodiment of the present invention, the indicator 70 is in the form of a heads-up display and the indication signal is a virtual image projected to appear forward of the vehicle 10. The indicator 70 provides a real-time image of the target area to increase the visibility of the objects during relatively low visible light level conditions without having to refocus ones eyes to monitor an indication device within the vehicle 14.

Figure 3:
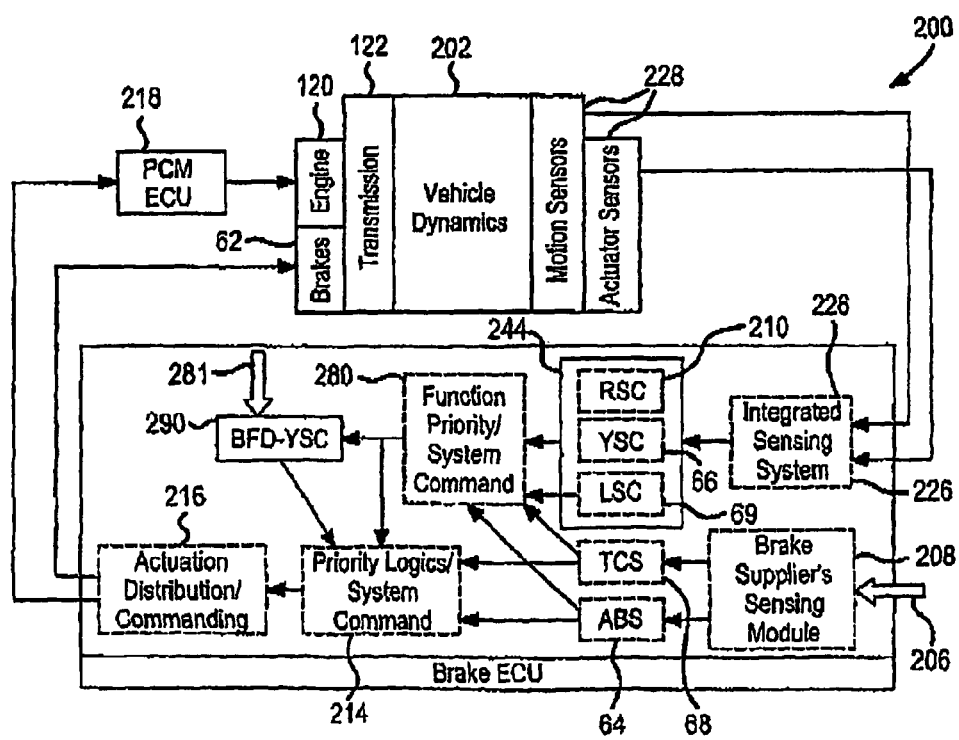
FIG. 3 is a block diagrammatic view illustrating interrelationships among various units within a control system for controlled vehicle dynamics in accordance with an embodiment of the present invention.

Referring now to FIG. 3, a block diagrammatic view illustrating interrelationships among various units within a control system 200 for controlled vehicle dynamics in accordance with an embodiment of the present invention is shown. The vehicle dynamics is represented by the module 202, which could be disturbed by a TFD due to tire force differential or by a BFD. The vehicle dynamics 202 includes the angular and translation movements of a vehicle. The motion and actuation sensors 228 generate signals corresponding to the vehicle dynamics disturbed by a TFD or a BFD and the actions of the various actuators. The sensors are fed into the ISS unit 226. The sensor signals and the calculated signals from a system other than from the ISS unit 226 (for example, the brake supplier's own brake control computations), represented by arrow 206, may be fed into the sensing module 208.

The ISS unit 226 is coupled to an integrated stability control unit 244 and may specifically be the TFD-stability control function, such as the RSC function module 210, the YSC function module 66, and the LSC function 69. A function priority system command 280 may also be included. A BFD-stability control function to control the undesired yaw motion of the vehicle due to controllable BFD, which is called BFD-YSC, is shown in 290. The output of the TCS module 68 and the ABS module 64 may be coupled to priority logic system command 214.

The TFD-stability control function priority/system command 280 and the output of the BFD-YSC 290 are also fed into the priority logics and system command 214. In 214, the normal stability control may be disabled when the system detects that the vehicle is receiving a BFD and the vehicle has a larger-than-normal yaw motion. Notice that the BFD-YSC receives the calculated variables through 280, and also receives the other signals 281, which may be collision detection signals or the other motion sensor signals. The system command 214 in turn is coupled to the actuation distribution and commanding block 216. The actuation distribution commanding block 216 is coupled to the powertrain control ECU 218 and to the brakes 62. The powertrain control module 218 may be coupled to the engine 120 and transmission 122. The actuation of the engine, the brakes and the transmission may affect the vehicle dynamics 202, which in turn is sensed by the various sensors. Thus, as can be seen, a continuous loop of sensing and controlling with respect to the vehicle dynamics is illustrated.

Figure 4:
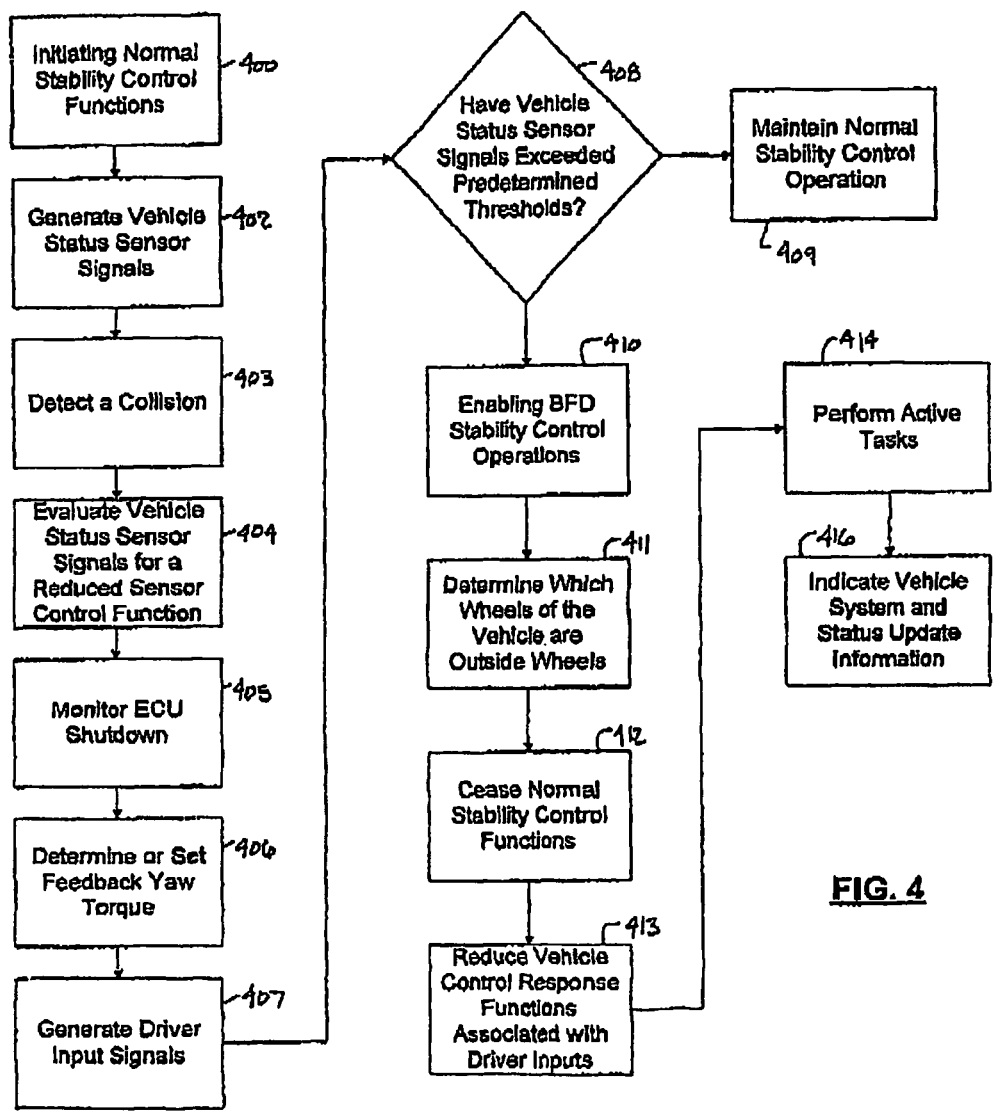
FIG. 4 is a logic flow diagram illustrating a method of operating a control system or a stability control system of a vehicle in accordance with multiple embodiments of the present invention.

Referring now to FIG. 4, a logic flow diagram illustrating a method of operating a control system or a stability control system of a vehicle in accordance with multiple embodiments of the present invention is shown. Although the following steps are described primarily with respect to the embodiments of FIGS. 1-2, they may be modified and applied to other embodiments of the present invention.

In step 400, initiating normal stability control functions (normal operating mode, which is effective to control the undesired vehicle motion due to a TFD). Normal stability control system parameters are set for normal operation. The parameters may include brake pressures, steering wheel angles, engine torques, and other various parameters associated with active control of a vehicle. The stated parameters may include two sets, one that is used when driver inputs are not received, and one used when driver inputs are received.

In step 402, vehicle status sensor signals are generated, such as by the vehicle status sensors 20 and 35-47, passive safety system sensors 28 and 29, active safety system sensors, which may share sensors 20, 28, 29, and 35-47, and the like or in response thereto. To name a few, a longitudinal acceleration signal, a longitudinal acceleration gradient signal, a lateral acceleration signal, a lateral acceleration gradient signal (the lateral acceleration difference between the sequential sampling time instants), a yaw rate signal, a yaw gradient signal (the yaw rate difference between the sequential time instants), and a collision status signal are generated.

In step 403, a body force disturbance (BFD) may be detected using known collision detection sensors, some of which are disclosed above, or via the vehicle motion sensors. The BFD here may be an external force which is generated when the vehicle is hit by a moving object such as a moving vehicle or a projectile, or when the vehicle hits a fixed object such as a tree or a pole. A BFD which is controllable and can generate larger-than-normal yaw rate may be detected when the magnitude of the lateral acceleration signal is greater than a first threshold but less than another threshold that is close to the airbag activation threshold, the magnitude of the lateral acceleration gradient signal is greater than a second threshold, and/or the yaw gradient signal is greater than a third threshold. A BFD which is controllable may also be detected when the magnitude of the longitudinal acceleration is greater than a first threshold, but below another threshold that is close to the airbag activation threshold, the magnitude of the longitudinal acceleration gradient signal is greater than a second threshold, and the magnitude of the yaw gradient signal is greater than a third threshold. The integration with passive safety devices may also be used in the detection of a controllable BFD.

In step 404, vehicle status sensor signals are evaluated. During an event when the vehicle body is receiving a BFD, some sensor signals may be saturated due to the normal stability control is designed to control the vehicle motion caused by tire force disturbances, such as tire force differentials, which generally cannot cause the yaw motion of the vehicle to go above a certain range (for example, from −75 deg/sec to +75 deg/sec). As a result of such saturation, the normal stability control function, such as the control system 11, assumes a reduced control functionality. A reduced sensor control function is initiated, which utilizes partial features or portions of the information gathered from the vehicle status sensors signals to pursue stability control functions. For example, the positive or negative sign of a saturated signal may be used in making a BFD-YSC stability control decision. Also, sensor information that is not normally associated with performing certain tasks may be used as a replacement in performing such a BFD-YSC task. As an example, during an event when the vehicle body receives a BFD, which could cause larger-than-normal yaw motion in the vehicle should a lateral acceleration sensor become saturated, inoperative, or damaged, the BYD-YSC stability control function may be maintained in an active state and act in response to a yaw rate signal, as opposed to a lateral acceleration signal in determining yaw motion.

In step 405, controller or ECU shutdown information is monitored. When the ECU is expected to shut-down due to sensor signals, which are due to the reception of a BFD, the shutdown may be overridden to maintain the ECU in an active state when the sensor signals are determined to be generated from the large body force disturbance. However, when the ECU is expected to shutdown due to other inappropriately functioning or inoperative hardware, the shutdown may be permitted.

In step 406, feedback yaw torque is determined or a feedback yaw torque status is set to a maximum value upon the detection that a vehicle is receiving a BFD and the vehicle experiences a larger-then-normal yaw motion.

In step 407, driver input signals are generated, such as by the driver input sensors or in response thereto.

In step 408, the vehicle status sensor signals are compared with predetermined thresholds, which are set for stability control system normal affective operation. It is predetermined that normal stability control system operation is affective in certain situations. When thresholds are exceeded, for example, when the lateral acceleration or the yaw rate of a vehicle is large, the normal stability control functions may have minimal affect or may not be affective in stabilizing the vehicle. This is especially true when panic actions are performed by a vehicle driver, which typically occurs when a vehicle is receiving a BFD. For a controllable BFD, although normal stability control functions may be minimally effective or ineffective in controlling the BFD-induced vehicle yaw motion, stability control operations or other additional stability control functions may be performed, as described below to stabilize the vehicle.

In step 409, the normal stability control system operation is maintained when the stated thresholds have not been exceeded. Note that a vehicle may experience larger than normal motions, which do not exceed one of the stated thresholds. A larger than normal yaw motion, for example, may be recoverable using normal stability control functions. In one embodiment of the present invention, a first level of thresholds are set for the activation of normal stability control functions and a second level of thresholds, that are larger than the first level of thresholds, are set for the deactivation of normal stability control functions and the activation of BFD-stability control functions. If the larger than normal motion is controllable by normal stability control operation then the control system follows driver intended requests. Over-steer and under-steer is controlled based on driver inputs. On the other hand, when the larger than normal motion is beyond the control authority of the normal stability control operation, additional or alternative stability control functions and/or the BFD-stability control functions are performed.

In step 410, overriding normal operation of the stability control system and enabling BFD-stability control functions (controlling the body force disturbance induced vehicle yaw motion) when the predetermined or second level of thresholds is exceeded and/or an application of a BFD is detected. The BFD-stability operating mode may include anti-yaw actuation. Normal stability control operation may be maintained or reactivated when a BFD is not detected.

In step 411, the control system determines which wheels of the vehicle are the outside wheels. Saturated yaw rate, lateral acceleration, wheel speed, and other signals may be used to determine which wheel is an outside wheel.

In step 412, the normal stability control functions are ceased and/or the normal stability control system parameters are adjusted accordingly. For example, brake pressure parameters may be increased over that set for normal stability control operation.

In step 413, vehicle control response functions associated with the driver input signals are reduced, modified, placed at a lower priority level, or not followed while the vehicle is receiving a body force disturbance or the stability control system is in a BFD-stability control mode. The driver input signals may be reduced, modified, or ignored when the trend in the vehicle status sensor signals reflects that the experienced larger than normal motion is increasing, although normal stability control is activated. The control system herein reduces or discards driver inputs when the predetermined thresholds are exceeded and/or when an application of a BFD is detected. The control system may perform tasks that are not a result of driver inputs. When an application of a BFD is not detected, driver inputs may be followed. In one embodiment, tasks are determined to minimize vehicle yaw. The tasks may be compared with driver intentions and then used to reduce the magnitude of or ignore driver requests.

In step 414, active tasks are performed in response to the adjusted parameters of step 412 and the vehicle status sensor signals. As an example, brake pressure may be increased to a level greater than that applied by a normal stability control function to quickly slow down and stabilize the motion of the vehicle, which is generated by the BFD, such as an external force generated when hit by a moving object. Brake pressure from a driver input may also or alternatively be redistributed or bypassed or adjusted in association with selected wheels. In one embodiment, brake pressure is applied that is greater than that of normal stability control over-steer control brake pressure for a front outside wheel and simultaneously while brake pressure is applied to a rear outside wheel of the vehicle. Brake pressure may be applied or increased to both the front and rear outside wheels and brake pressure may be released to both the inside wheels when the vehicle yaw rate is greater than a certain threshold. Brake pressure is applied to maintain a heading direction and/or to minimize the amount of heading angle change. The active tasks may be performed when passive restraints have not been triggered.

In another embodiment, when the yaw rate experienced by the vehicle is a high clockwise motion and the front axle of the vehicle is in a right sliding motion (or counter-clockwise vehicle motion, left sliding front axle motion), then brake pressure is applied to both front wheels to reduce the large longitudinal wheel slip.

In another embodiment, one-wheel braking is performed by the normal stability control when the vehicle yaw rate is within a normal range. Two-wheel braking is performed during excessive vehicle yaw rates. During excessive vehicle yaw rates, reduction in yaw is at high priority and the outside wheels are braked. Four-wheel braking is performed as soon as the vehicle yaw rate is reduced to or below a predetermined yaw rate level. At this point, reducing the speed of the vehicle is a high priority.

Actuator systems other than active braking systems, such as EPAS, active front steering (AFS), active limited slip-differential (e-Diff), and other known actuator systems, can also be activated to mitigate the large yaw rate due to a controllable BFD. Integrated actuation of multiple actuators using multiple-stage control algorithm may be used. As another example, driver intentions may be overridden and engine torque may be reduced with the same amount or more than as a driver's intended engine torque increase. Yet another example includes decreasing EPAS gain such that the driver's hand wheel steering is not transferred to the vehicle wheels.

In step 416, the control system may indicate, such as with the indicator 70, to a vehicle operator that active tasks are being performed, the status of the vehicle, and that driver intended inputs are minimized or overridden. The vehicle status of receiving a BFD may be indicated. In one embodiment, the warm-up signal from the passive safety system is used as an indication of a potential incident where the vehicle is receiving an external force that applied to the vehicle body. This information may also be stored, viewed, and downloaded for future review and/or evaluation. The viewing and downloading may be to an offboard or offsite system.

The above tasks may be performed via any one or more of the herein mentioned controllers, control systems, stability control systems, or the like.

The above-described steps are meant to be illustrative examples; the steps may be performed sequentially, synchronously, simultaneously, or in a different order depending upon the application.

While particular embodiments of the invention have been shown and described, numerous variations and alternate embodiments will occur to those skilled in the art. Accordingly, it is intended that the invention be limited only in terms of the appended claims.

What is claimed is:

1. A yaw stability control system for a vehicle comprising:
at least one vehicle status sensor generating at least one sensor signal;
at least one driver input sensor generating at least one input signal;
a yaw rate sensor generating a yaw gradient signal that reflects a yaw rate difference between sequential sampling instants;
a lateral acceleration sensor generating a lateral acceleration signal;
a controller disabling normal yaw stability control operation associated with tire force differentials and enabling a body-force-disturbance yaw stability control operation, comprising at least partially reducing normal yaw stability control response functions associated with the at least one input signal and performing body-force-disturbance yaw stability control functions in response to the at least one sensor signal; and
the controller incrementally increasing brake pressure greater than that applied by normal yaw stability control operation in response to the yaw gradient signal and the lateral acceleration signal.

2. A system as in claim 1 wherein the at least one vehicle status sensor comprises a body-force-disturbance detection unit that generates a body-force-disturbance flag, which indicates reception of a body-force-disturbance, the controller overriding normal operation of the yaw stability control system and at least partially reducing response functions associated with the at least one input signal in response to the body-force-disturbance flag.

3. A system as in claim 2 wherein the controller detects a body-force-disturbance applied on at least one of a front, a rear, and a side of the vehicle in response to the body-force-disturbance flag and overrides normal operation of the yaw stability control system and at least partially reduces response functions associated with the at least one input signal in response to the detection.

4. A system as in claim 2 wherein the controller detects a body-force-disturbance that is applied in a longitudinal offset location with respect to the center of gravity of the vehicle in response to the body-force-disturbance flag and overrides normal operation of the yaw stability control system and at least partially reduces response functions associated with the at least one input signal in response to the detection.

5. A system as in claim 1 wherein the at least one driver input sensor generates the at least one input signal in association with at least one request selected from a gas pedal request, a brake pedal request, and a steering wheel request.

6. A system as in claim 1 wherein the at least one vehicle status sensor is selected from at least one of a yaw rate sensor, a lateral acceleration sensor, a longitudinal acceleration sensor, an accelerometer, a contact sensor, and a pressure sensor.

7. A system as in claim 1 wherein the controller determines that the sensor signal is greater than a yaw threshold for the normal yaw stability control system effective operation, the controller overriding normal operation of the yaw stability control system and at least partially reducing response functions associated with the at least one input signal in response to the determination.

8. A method of controlling a yaw stability control system for a vehicle comprising:
generating at least one vehicle status sensor signal;
generating at least one vehicle operator input signal;
generating a yaw gradient signal that reflects the yaw rate difference between sequential sampling time instances;
generating a longitudinal acceleration signal;
generating a longitudinal acceleration gradient signal that reflects the longitudinal acceleration difference between sequential sampling time instants;
comparing the at least one vehicle status sensor signal to a first threshold set for yaw stability control system normal affective operation:
overriding normal operation of the yaw stability control system when the at least one threshold is exceeded:
at least partially reducing response functions associated with the at least one input signal;
detecting a body-force-disturbance when the magnitude of the longitudinal acceleration is greater than a first threshold, the magnitude of the longitudinal acceleration gradient is greater than a second threshold and the magnitude of the yaw gradient signal is greater than a third threshold;
disabling normal yaw stability control and enabling an enhanced body-force-disturbance yaw stability control in response to the detection; and
increasing brake pressure greater than that applied by a normal yaw stability control function.

9. A system as in claim 1 wherein the controller disregards the at least one input signal when the at least one sensor signal exceeds at least one threshold set for yaw stability control system normal affective operation.

10. A system as in claim 1 wherein the controller compares the at least one sensor signal to at least one threshold set for yaw stability control system normal affective operation, overrides normal operation of the yaw stability control system, at least partially reduces response functions associated with the at least one input signal, and performs tasks to minimize yaw of the vehicle when the at least one threshold is exceeded.

11. A system as in claim 10 wherein the controller performs the tasks to minimize lateral acceleration and yaw rate of the vehicle.

12. A system as in claim 10 wherein the controller in overriding normal operation of the yaw stability control system reduces engine torque, decreases steering gain, and redistributes brake pressure.

13. A method as in claim 8 further comprising disabling body-force-disturbance yaw stability control operation, enabling normal response functions associated with the at least one input signal, and applying brake pressure associated with normal yaw stability control function when the at least one vehicle status sensor signal is less than the at least one threshold.

14. A method as in claim 8 wherein overriding normal operation of the stability control system, reducing response functions associated with the at least one vehicle operator input signal, and increasing brake pressure greater than that applied by normal yaw stability control function are performed when the vehicle status sensor signal increases in response to normal yaw stability control operation.

15. A method as in claim 8 wherein increasing brake pressure comprises applying brake pressure greater than that of normal yaw stability control over-steer control brake pressure for a front outside wheel and simultaneously applying brake pressure to a rear outside wheel of the vehicle.

16. A method as in claim 8 comprising:
generating a lateral acceleration signal;
generating a lateral acceleration gradient signal that reflects the yaw rate difference between sequential sampling time instants;
detecting a body-force-disturbance when the magnitude of the lateral acceleration signal is greater than a fourth threshold, the magnitude of the lateral acceleration gradient is greater than a fifth threshold, and the magnitude of the yaw gradient signal is greater than a sixth threshold; and
disabling normal yaw stability control and enabling an enhanced body-force-disturbance yaw stability control in response to the detection.

* * * * *